No. 617,786. Patented Jan. 17, 1899.
S. K. VAUGHAN.
COMBINED CULTIVATOR AND POTATO DIGGER.
(Application filed Feb. 19, 1898.)
(No Model.)
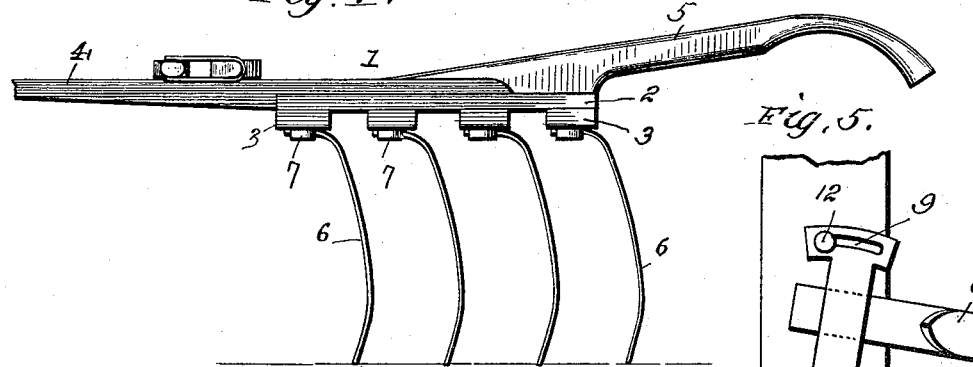
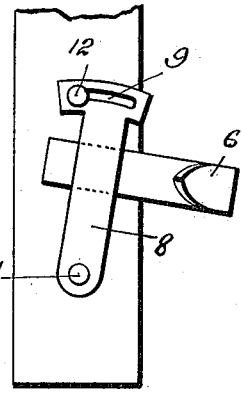
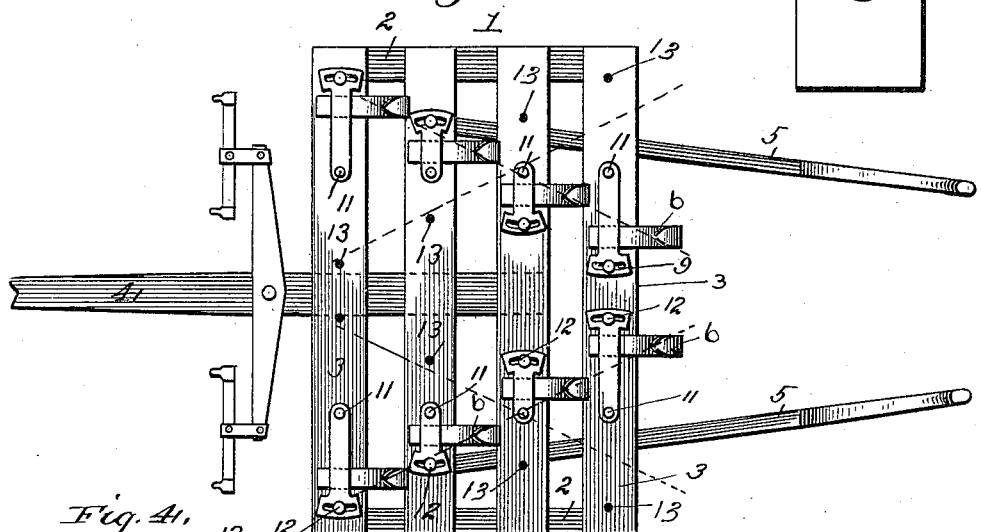
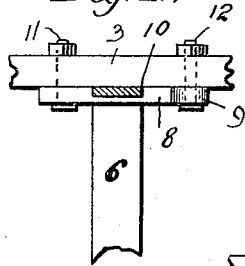
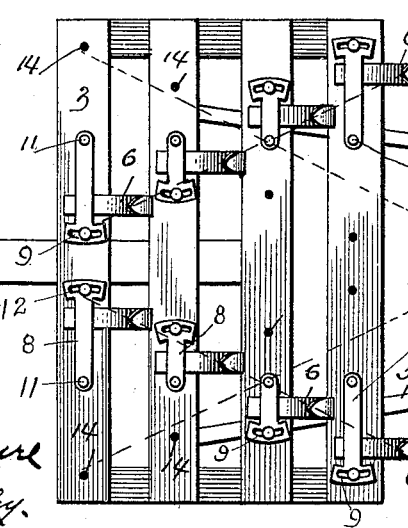

UNITED STATES PATENT OFFICE.

STEPHEN K. VAUGHAN, OF HYDE PARK, VERMONT.

COMBINED CULTIVATOR AND POTATO-DIGGER.

SPECIFICATION forming part of Letters Patent No. 617,786, dated January 17, 1899.

Application filed February 19, 1898. Serial No. 670,943. (No model.)

*To all whom it may concern:*

Be it known that I, STEPHEN K. VAUGHAN, a citizen of the United States, residing at Hyde Park, in the county of Lamoille and State of Vermont, have invented certain new and useful Improvements in a Combined Horse-Hoe and Potato-Digger, of which the following is a specification, reference being had therein to the accompanying drawings, in which—

Figure 1 is a side elevation of the device. Fig. 2 is a bottom view thereof arranged as a potato-digger. Fig. 3 is a similar view of the device arranged as a hoe or cultivator. Fig. 4 is a detail of the adjustable tooth-securing clip, and Fig. 5 a detail bottom view thereof.

The invention has for its object to provide a convertible cultivating implement which may be readily and easily changed from a horse-hoe or cultivator, suitable for use in hoeing young corn, cabbage, and other crops, to a potato digger or harvester, and vice versa, these changes being accomplished by simple means.

The invention consists in the novel combination and arrangement of parts hereinafter described, and particularly pointed out in the claims appended.

Referring to the various parts by numerals, 1 designates a rectangular frame which is composed of the end bars 2 and four or more transverse parallel bars 3, secured thereto. A draft-tongue 4 is secured to the upper side of the frame, and projecting rearwardly from the frame is a pair of handles 5. Secured to the bottom of the bars forming the frame are a set of cultivator-teeth 6, said teeth being shown in Fig. 2 as placed in a V-shaped arrangement in plan view, the point of the V being at the rear edge of the frame, in which form it is adapted for use as a potato-digger. These teeth are preferably secured in place by means of clamps 8, which are formed with angular recesses 10 in their upper surfaces to receive the angular upper ends of the teeth 6, said teeth being held in said recesses by being clamped rigidly against the under sides of the bars 3. The clamps 8 are secured in place by means of pivot-bolts 11 and clamping-bolts 12. These latter bolts pass through segmental slots in the clamps 8, by which arrangement the teeth may be shifted laterally on their supporting-bars, as shown in Fig. 5, to throw the dirt inward or outward, as the exigencies of the case require.

To provide for shifting the V arrangement of the teeth so that the point of the V will be at the front edge of the frame, in which form the device is adapted for use as a cultivator, a supplemental bolt-hole 13 is formed in each of the bars on the side of the pivot-bolt opposite from bolt 12 and in line therewith and an equal distance from the pivot-bolt. These supplemental holes on the forward bars are inside of the pivot-bolts 11, while those on the rear bars are outside of said bolts. To shift the teeth, it is simply necessary to remove bolts 12, turn clamps 8 on their pivots, replace teeth in recesses in clamps, and insert bolts 12 in the supplemental holes. It is preferred that the pivot-bolts of each series of clamps shall be in a line and parallel with the longitudinal center of the frame, the clamps being of such a length as to bring the teeth of each side or series into alinement obliquely in either position they may be adjusted to. In this arrangement, as is evident, the front and rear clamps will be the longest, the intermediate ones being somewhat shorter. As will be observed, the frame-bars need only be extended outward far enough beyond the pivot-bolts to permit of the outer supplemental holes being formed therein.

Having thus fully described my invention, what I claim, and desire to secure by Letters Patent, is—

1. In a convertible cultivator and potato-harvester, the combination of a frame, provided with handles and draft appliances, two rows of teeth depending from the frame, one on each side of the line of draft and running obliquely thereto, and means for adjustably clamping each tooth to the frame whereby the teeth in each row may be shifted toward and from the line of draft, whereby the obliquity of each row may be reversed with respect to the line of draft, to convert the machine from a harvester into a cultivator and vice versa.

2. In a convertible cultivator and potato-harvester, the combination of a frame, a series of teeth depending therefrom, means for removably clamping said teeth to the frame so that they may be shifted laterally thereon, said means consisting of clips, each clip being provided with a pivot-bolt and a removable clamping-bolt, and the frame being formed with a series of supplemental bolt-holes, substantially as described.

3. In a convertible cultivator and potato-digger the combination of a frame, two series of teeth depending therefrom in a V-shaped arrangement, one series being on each side of the line of draft, clips clamping said teeth, a pivot-bolt and a clamping-bolt removably securing each of said clips to the frame, said frame being provided with a supplemental bolt-hole for each clamping-bolt, whereby the teeth may be arranged in V form in plan, and the point of the V may be shifted to the front or the rear part of the frame, as desired, substantially as described.

4. In a convertible cultivator and potato-digger the combination of a frame, a series of teeth depending therefrom, in V-shaped arrangement, clips for clamping said teeth, the clips securing the front and rear teeth being longer than the intermediate clips, a pivot-bolt and a removable clamping-bolt for each clip, supplemental holes for the clamping-bolts, said holes being so arranged that by shifting the clips the teeth may be placed in a V-shaped arrangement and the point of the V may be shifted to either the front or the rear of the frame, substantially as described.

5. The combination of a supporting-bar, and a cultivator-tooth, a clip for securing said tooth to said support, the body portion thereof formed with an angular tooth-receiving recess in its upper surface, a segmental slot at one end and a bolt-hole at its other end, a clamping-bolt passing through said slot and a pivot-bolt at the other end of said clip, whereby the cultivator-tooth may be adjusted laterally, inward or outward, substantially as described.

In testimony whereof I affix my signature, in presence of two witnesses, this 14th day of February, 1898.

STEPHEN K. VAUGHAN.

Witnesses:
  A. B. PEASE,
  HENRY M. NOYES.